US00RE50081E

(19) United States
(12) Reissued Patent
Shibamoto et al.

(10) Patent Number: US RE50,081 E
(45) Date of Reissued Patent: Aug. 20, 2024

(54) CONTROLLER FOR ENGINE AND METHOD FOR CONTROLLING ENGINE

(71) Applicant: TOYOTA JIDOSHA KABUSHIKI KAISHA, Toyota (JP)

(72) Inventors: Keisuke Shibamoto, Toyota (JP); Toshikazu Kato, Toyota (JP); Shunichi Hara, Toyota (JP)

(73) Assignee: TOYOTA JIDOSHA KABUSHIKI KAISHA, Toyota (JP)

(21) Appl. No.: 17/842,395

(22) Filed: Jun. 16, 2022

Related U.S. Patent Documents

Reissue of:
(64) Patent No.: 11,220,157
Issued: Jan. 11, 2022
Appl. No.: 16/697,307
Filed: Nov. 27, 2019

(30) Foreign Application Priority Data

Jan. 8, 2019 (JP) ..... 2019-001065

(51) Int. Cl.
*B60H 1/00* (2006.01)
*F01N 9/00* (2006.01)

(52) U.S. Cl.
CPC ..... *B60H 1/00735* (2013.01); *F01N 9/002* (2013.01)

(58) Field of Classification Search
CPC ..... B60H 1/00735; F01N 2430/00; F01N 2900/08; F01N 2900/10; F01N 3/023; F01N 9/002; H01L 27/14643; H01L 27/14658; Y02T 10/40; F02D 29/02; F02D 41/029; F02D 41/123
See application file for complete search history.

(56) References Cited

U.S. PATENT DOCUMENTS 4,510,902 A 4/1985 Tsuchida et al.
10,487,715 B2 * 11/2019 De Smet ..... F01N 3/023
2013/0197749 A1 * 8/2013 Martini ..... F02N 11/084 701/36
2018/0106206 A1 4/2018 Tsunoda et al.
2018/0156097 A1 6/2018 Suzuki et al.
2018/0244131 A1 8/2018 Iwamoto
(Continued)

FOREIGN PATENT DOCUMENTS

CN 107949691 A 4/2018
CN 107972658 A 5/2018
DE 102010046762 A1 * 3/2011 ..... F01N 11/007
(Continued)

OTHER PUBLICATIONS

Oct. 27, 2021 Notice of Allowance issued in U.S. Appl. No. 16/697,307.

*Primary Examiner* — Rachna S Desai
(74) *Attorney, Agent, or Firm* — Oliff PLC

(57) ABSTRACT

A controller for an engine includes processing circuitry configured to perform fuel cut-off for regenerating the filter by burning fine particulate matter collected in the filter. The processing circuitry is configured to perform an interruption process for interrupting the fuel cut-off in a case in which warming of the passenger compartment is requested when the fuel cut-off is being performed and an engine coolant temperature, which is a temperature of the engine coolant, becomes lower than or equal to a predetermined temperature after the fuel cut-off is started.

9 Claims, 4 Drawing Sheets

(56) References Cited

U.S. PATENT DOCUMENTS

2019/0241040 A1* 8/2019 Errick ..... B60H 1/02

FOREIGN PATENT DOCUMENTS

| | | | |
|---|---|---|---|
| JP | S58-174137 | A | 10/1983 |
| JP | H10-280990 | A | 10/1998 |
| JP | 2018-065448 | A | 4/2018 |
| JP | 2018-090154 | A | 6/2018 |

* cited by examiner

CONTROLLER FOR ENGINE AND METHOD FOR CONTROLLING ENGINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a Reissue of U.S. Pat. No. 11,220,157, issued Jan. 11, 2022 from U.S. application Ser. No. 16/697,307, filed Nov. 27, 2019, which claims the benefit of Japanese Patent Application No. 2019-001065 filed Jan. 8, 2019. The disclosure of each prior application is hereby incorporated by reference herein in its entirety.*

BACKGROUND

1. Field

The present disclosure relates to a controller for an engine and a method for controlling an engine.

2. Description of Related Art

A known engine includes a filter arranged in an exhaust passage to collect fine particulate matter from exhaust gas. Japanese Laid-Open Patent Publication No. 2018-090154 describes an engine that includes such a filter and performs filter regeneration control to burn and remove fine particulate matter, which is collected in the filter, by performing fuel cut-off and supplying oxygen to the filter.

A vehicle including an engine uses the heat of an engine coolant to warm a passenger compartment. Thus, if the engine undergoes fuel cut-off during filter regeneration control for a long period of time, combustion will not occur and thereby lowering the temperature of the engine coolant. Thus, warming cannot be continued.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure provides a controller for an engine. The engine is installed in a vehicle configured to use heat of an engine coolant to warm a passenger compartment, and the engine includes an exhaust passage including a filter configured to collect fine particulate matter from exhaust gas. The controller includes processing circuitry configured to perform fuel cut-off for regenerating the filter by burning fine particulate matter collected in the filter, and the processing circuitry is configured to perform an interruption process for interrupting the fuel cut-off in a case in which warming of the passenger compartment is requested when the fuel cut-off is being performed and an engine coolant temperature, which is a temperature of the engine coolant, becomes lower than or equal to a predetermined temperature after the fuel cut-off is started.

When fuel cut-off for filter regeneration is performed, combustion in the engine is stopped and the temperature of the engine coolant becomes lower. Thus, when the fuel cut-off is performed during warming of the passenger compartment, heating performance may be lowered. The fuel cut-off for filter regeneration may be performed when there is a request to warm the passenger compartment. In this case, the controller for the engine interrupts the fuel cut-off when the engine coolant temperature becomes lower to a fixed value after the fuel cut-off is started. Thus, when the combustion is restarted in the engine, the coolant temperature is increased. That is, when the engine coolant temperature becomes lower, the fuel cut-off is intermittently performed with an interruption until the engine coolant temperature is recovered. This performs the fuel cut-off for filter regeneration in a preferred manner during warming of the passenger compartment.

There is a correlation between a level of lowered heating performance after the fuel cut-off is started and the amount of decrease in the engine coolant temperature after the fuel cut-off is started. Thus, the processing circuitry may be configured to interrupt the fuel cut-off in the interruption process in a case in which the amount of decrease in the engine coolant temperature from when the fuel cut-off is started becomes greater than or equal to an interruption determination value.

Lowered heating performance is more noticeable when the engine coolant temperature is low than when the engine coolant temperature is high even if the amount of decrease in the engine coolant temperature after the fuel cut-off is started is the same. Thus, the interruption determination value may be set to a larger value when the engine coolant temperature is high than when the engine coolant temperature is low.

When heating performance is sufficiently recovered after the fuel cut-off is interrupted, the fuel cut-off may be restarted. Thus, the processing circuitry may be configured to perform a restart process that restarts the fuel cut-off when the engine coolant temperature becomes higher than or equal to a predetermined temperature after the fuel cut-off is interrupted by the interruption process.

There is a correlation between a level of recovered heating performance after the fuel cut-off is interrupted and the amount of increase in the engine coolant temperature after the fuel cut-off is interrupted. Thus, the processing circuitry may be configured to restart the fuel cut-off in the restart process when an amount of increase in the engine coolant temperature after the fuel cut-off is interrupted by the interruption process becomes greater than or equal to a restart determination value. Further, the restart determination value may be set to a larger value when the engine coolant temperature is low than when the engine coolant temperature is high.

One aspect of the present disclosure provides a method for controlling an engine. The engine is installed in a vehicle configured to use heat of an engine coolant to warm a passenger compartment, and the engine includes an exhaust passage that includes a filter configured to collect fine particulate matter from exhaust gas. The method includes performing a fuel cut-off for regenerating the filter by burning fine particulate matter collected in the filter and performing an interruption process that interrupts the fuel cut-off in a case in which warming of the passenger compartment is requested when the fuel cut-off is being performed and an engine coolant temperature, which is a temperature of the engine coolant, becomes lower than or equal to a predetermined temperature after the fuel cut-off is started.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for an engine according to one embodiment will now be described with reference to FIGS. 1 to 6. The controller for an engine in the present embodiment is applied to an engine installed in a hybrid vehicle.

Figure 1:
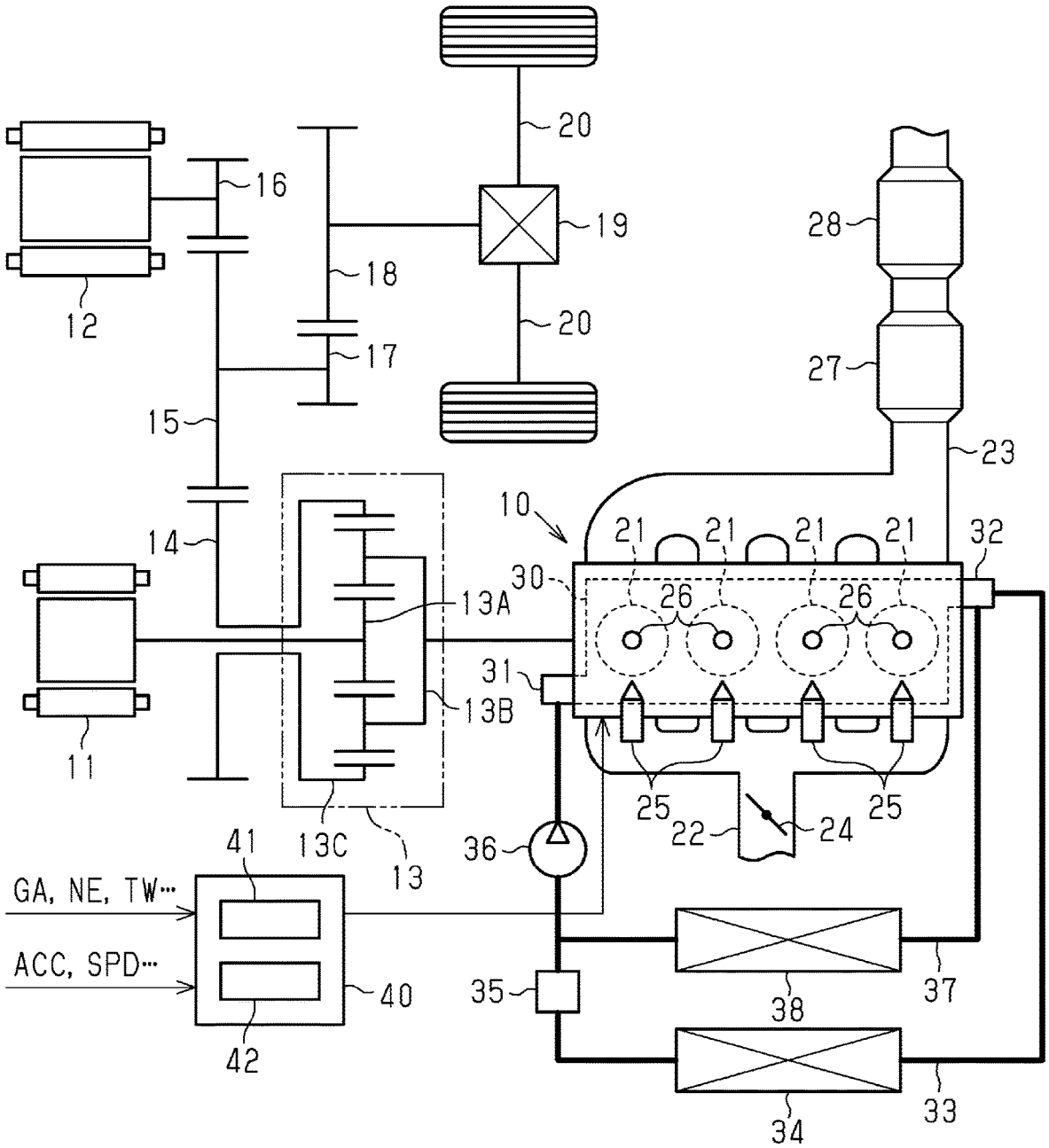
FIG. 1 shows a diagram showing the configuration of a controller for an engine according to one embodiment, the structure of the engine to which the controller is applied, and the structure of a drive system of a hybrid vehicle in which the engine is installed.

As shown in FIG. 1, a drive source is installed in the hybrid vehicle, and the drive source includes an engine 10 and two motor generators, namely, a first motor generator 11 and a second motor generator 12. The first motor generator 11 and the second motor generator 12 each function as an electric motor, which is supplied with power to generate force, and a generator, which receives external force to generate power.

The hybrid vehicle includes a planetary gear mechanism 13 that has three rotation elements, namely, a sun gear 13A, a planetary carrier 13B, and a ring gear 13C. In the planetary gear mechanism 13, the sun gear 13A is coupled to the first motor generator 11 and the planetary carrier 13B is coupled to the engine 10. A counter drive gear 14 is coupled to and rotated integrally with the ring gear 13C of the planetary gear mechanism 13. Further, the counter drive gear 14 is meshed with a counter driven gear 15. The second motor generator 12 is coupled to a reduction gear 16 meshed with the counter driven gear 15. The counter driven gear 15 is further coupled to and rotated integrally with a final drive gear 17. The final drive gear 17 is meshed with a final driven gear 18. The final driven gear 18 is coupled to right and left axle shafts 20 via a differential mechanism 19.

The engine 10 includes cylinders 21 that burn air-fuel mixture, an intake passage 22 through which intake air flows into the cylinders 21, and an exhaust passage 23 through which exhaust gas generated by the combustion of the air-fuel mixture in the cylinders 21 flows. The intake passage 22 includes a throttle valve 24, which serves as a valve that regulates the flow rate of the intake air in the intake passage 22. The cylinders of the engine 10 each include a fuel injection valve 25 that injects fuel into the intake air and an ignition device 26 that ignites the air-fuel mixture with a spark discharge. A three-way catalyst converter 27 that oxidizes hydrocarbon and carbon monoxide in exhaust gas and reduces nitrogen oxides in the exhaust gas is arranged in the exhaust passage 23. A filter 28 that collects fine particulate matter from the exhaust gas is further arranged at a downstream side of the three-way catalyst converter 27 in the exhaust passage 23.

The structure of a cooling system of the engine 10 will now be described. The engine 10 includes a water jacket 30 that is a water channel through which coolant flows around the cylinders 21. The engine 10 also includes an inlet 31 through which the coolant flows into the water jacket 30 and an outlet 32 through which the coolant flows out of the water jacket 30. The inlet 31 and the outlet 32 of the water jacket 30 are connected by a radiator channel 33 outside the engine 10. The radiator channel 33 includes a radiator 34 that cools the coolant by exchanging heat with the ambient air. An electronic thermostat 35 and electric water pump 36 are arranged at a downstream side of the radiator 34 in the radiator channel 33. The cooling system of the engine 10 also includes a heater channel 37 that connects the outlet 32 of the water jacket 30 to a portion between the thermostat 35 and the water pump 36 of the radiator channel 33. The heater channel 37 includes a heater core 38 that exchanges heat with the coolant to warm air that is sent to a passenger compartment.

The hybrid vehicle further includes an electronic control unit 40. The electronic control unit 40 includes an arithmetic processing circuit 41, which executes various types of calculating processes related to vehicle control, and a memory 42, which stores programs and data for vehicle control. The electronic control unit 40 receives information indicative of an operation condition of the engine 10, such as an intake air amount GA, an engine rotation speed NE, and an engine coolant temperature TW, and information indicative of a driving condition of the vehicle, such as an accelerator pedal depression degree ACC and a vehicle speed SPD from various types of sensors arranged in the vehicle. The engine coolant temperature TW represents the temperature of the engine coolant passing through the water jacket 30 and flowing into the radiator channel 33 or the heater channel 37 from the outlet 32. Based on such information, the arithmetic processing circuit 41 of the electronic control unit 40 executes various types of control on the hybrid vehicle by reading and executing programs stored in the memory 42. The electronic control unit 40 executes control including regenerative/driving torque control on the first motor generator 11 and the second motor generator 12, air conditioning control inside the passenger compartment, and engine control. In the present embodiment, the electronic control unit 40 that controls operation of the engine 10 as one routine of vehicle control corresponds to a controller for an engine.

In air conditioning control, if the temperature of the passenger compartment is lower than a preset temperature, the electronic control unit 40 heats the air sent to the passenger compartment with the heater core 38 to warm the passenger compartment. The amount of air sent to warm the passenger compartment is determined based on the difference between the temperature of the passenger compartment and the preset temperature, the ambient temperature, the engine coolant temperature TW, and the like. If the engine coolant temperature TW is low, the air sent to the passenger compartment cannot be sufficiently heated. Thus, if the engine coolant temperature TW is lower than or equal to a predetermined air delivery stopping temperature TW0, the air sent to the passenger compartment is stopped even if heating is requested.

The electronic control unit 40 estimates the temperature of the filter 28 based on the operation condition of the engine 10 such as the intake air charging efficiency of the cylinder 21 and the engine rotation speed NE. The temperature of the filter 28 estimated by the electronic control unit 40 will be referred to as an estimated filter temperature TF. The electronic control unit 40 estimates the amount of fine particulate matter collected in the filter 28 based on the engine rotation speed NE, the intake air charging efficiency, the estimated filter temperature TF, and the like. The amount of fine particulate matter collected in the filter 28 that is estimated by the electronic control unit 40 will be referred to as an estimated PM deposition amount PS. The electronic control unit 40 executes filter regeneration control that prevents collected fine particulate matter from clogging the filter 28 based on the estimated PM deposition amount PS as one routine of engine control.

Figure 2:
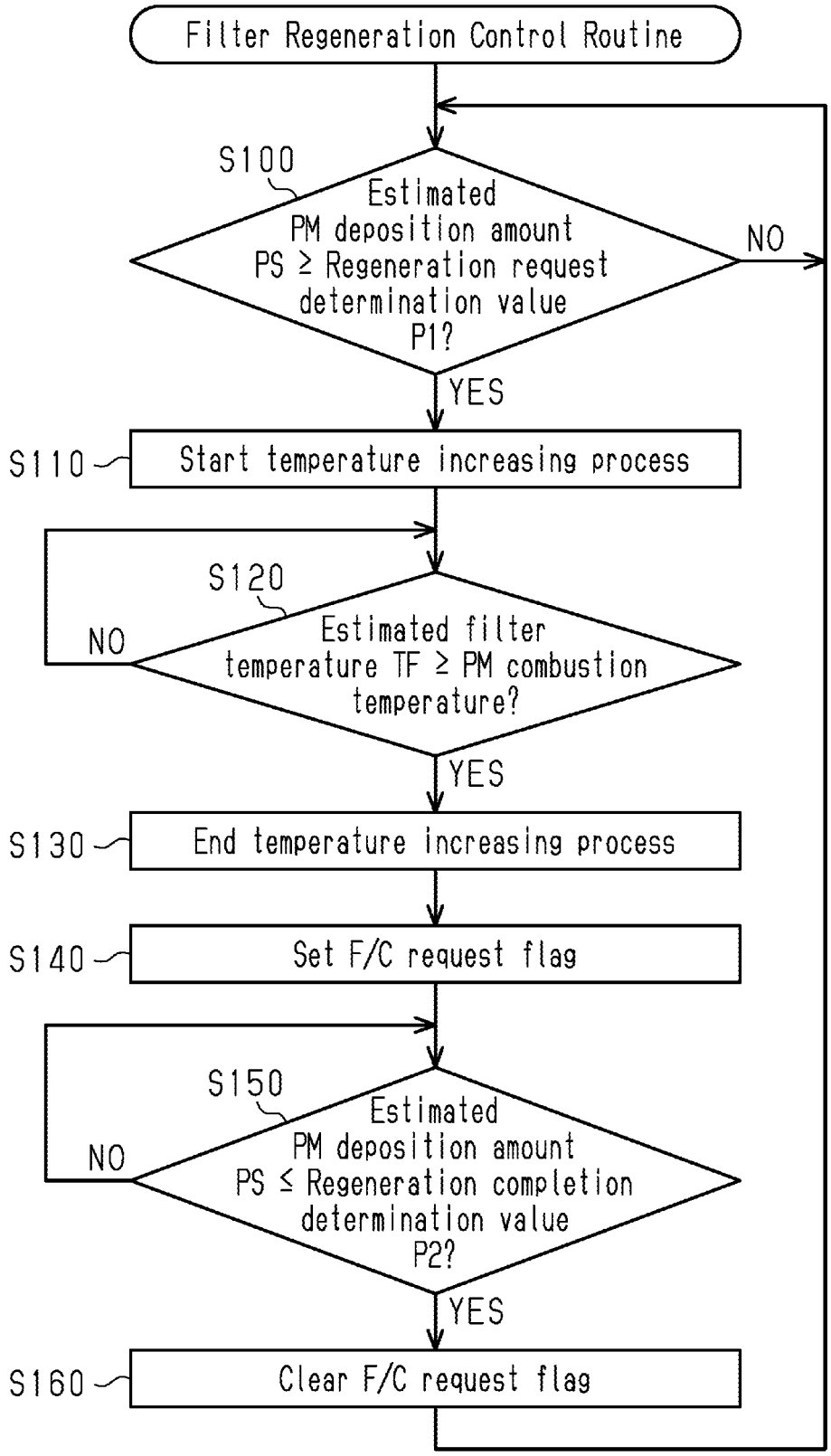
FIG. 2 is a flowchart showing a flowchart of a filter regeneration control routine performed by the controller of FIG. 1.

FIG. 2 shows a processing routine executed by the electronic control unit 40 in relation with filter regeneration control. The electronic control unit 40 executes this routine as long as the engine 10 is running.

The electronic control unit 40 executes this routine in set control cycles. In step S100 of this routine, the electronic control unit 40 determines whether an estimated PM deposition amount PS of the filter 28 is greater than or equal to a predetermined regeneration request determination value P1. If the estimated PM deposition amount PS is determined as being less than the regeneration request determination value P1 (S100: NO), the same determination is made in the next control cycle. The regeneration request determination value P1 is set to a value slightly smaller than the upper limit value of the deposition amount of fine particulate matter in the filter 28 so that the pressure loss of exhaust gas is within a tolerable range at the filter 28.

In step S100, when determining that the estimated PM deposition amount PS is greater than or equal to the regeneration request determination value P1 (S100: YES), the electronic control unit 40 proceeds to step S110. In step S110, the electronic control unit 40 starts a temperature increasing process that raises the temperature of the filter 28. The temperature increasing process is performed by, for example, raising a requested output of the engine 10 or the lower limit rotation speed of the engine 10, delaying an ignition time, or prohibiting an intermittent stopping of the engine 10.

The temperature increasing process continues until the electronic control unit 40 determines in step S120 that the estimated filter temperature TF is higher than or equal to the PM combustion temperature that starts burning fine particulate matter in the filter 28. If the estimated filter temperature FT becomes higher than or equal to the PM combustion temperature (S120: YES), the electronic control unit 40 ends the temperature increasing process of step S130 and sets an F/C request flag in step S140. The F/C request flag is set to indicate that a fuel cut-off of the engine 10 has been requested to regenerate the filter 28, that is, to burn the fine particulate matter deposited on the filter 28.

If the F/C request flag is set and a process of an F/C determination routine, which will be described below, allows fuel cut-off to be performed, the electronic control unit 40 performs fuel cut-off to regenerate the filter. When performing the fuel cut-off, the electronic control unit 40 stops the injection of fuel from the fuel injection valve 25 and the discharge of sparks at the ignition device 26 in the engine 10. Further, the electronic control unit 40 maintains the rotation of the engine 10 with force generated by the first motor generator 11. In this case, the electronic control unit 40 allows the second motor generator 12 to generate driving force necessary for the hybrid vehicle to travel.

When fuel cut-off is performed in this manner, the air drawn into the intake passage 22 passes through the cylinders 21 and flows into the exhaust passage 23. This supplies the filter 28 with the oxygen necessary for burning fine particulate matter. The temperature increasing process raises the temperature of the filter 28 to the temperature necessary for burning fine particulate matter. Thus, the fuel cut-off burns the particulate matter deposited on the filter 28.

Then, in step S150, if the electronic control unit 40 determines that the estimated PM deposition amount PS is less than or equal to a predetermined regeneration completion determination value P2 (S150: YES), the electronic control unit 40 clears the F/C request flag in step S160. Then, the electronic control unit 40 returns to step S100. The regeneration completion determination value P2 is set to a value that is sufficiently lower than the regeneration request determination value P1.

Figure 3:
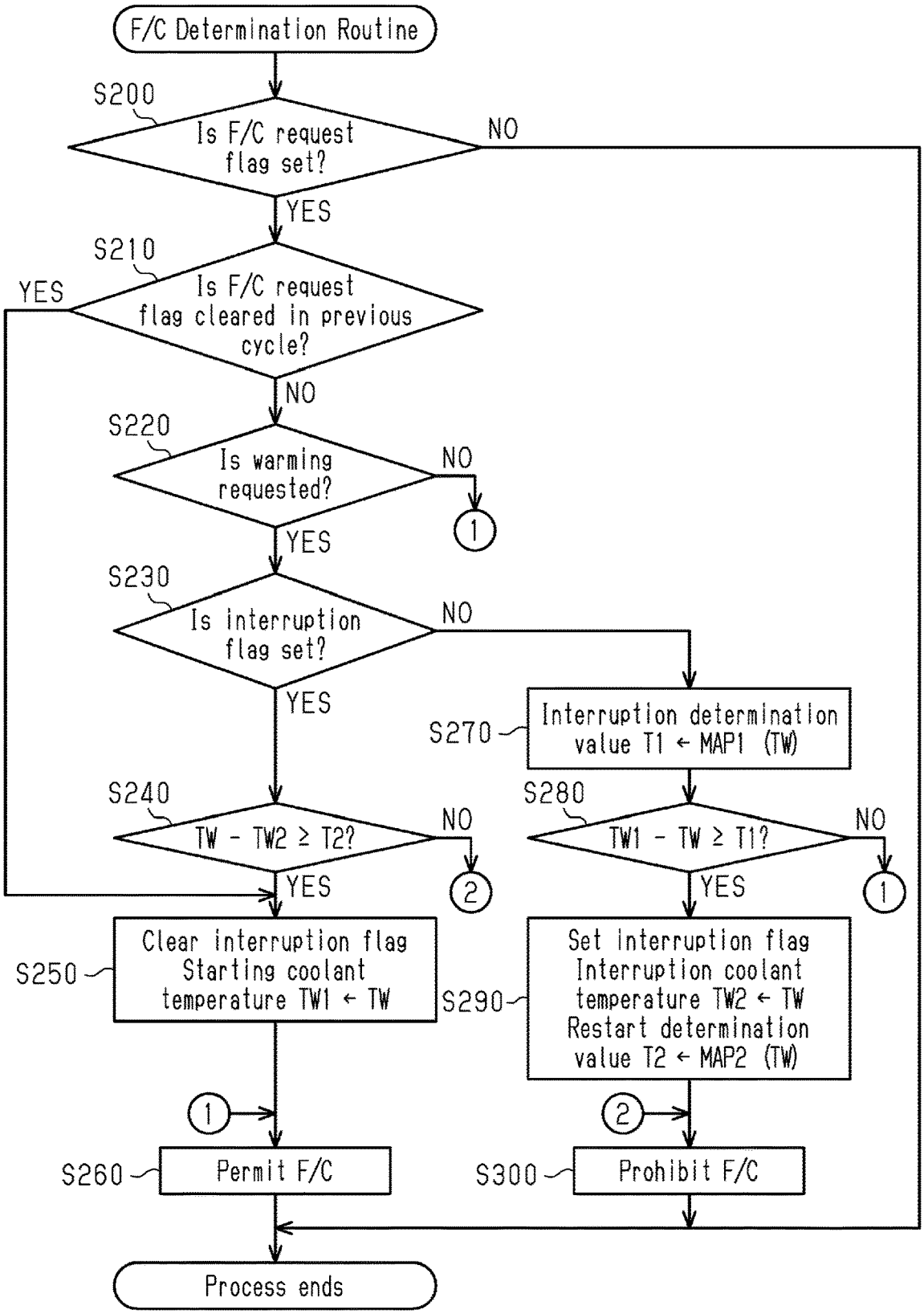
FIG. 3 is a flowchart showing an F/C determination routine performed by the controller of FIG. 1.

FIG. 3 shows a flowchart of an F/C determination routine. The electronic control unit 40 repeatedly executes this routine in set control cycles as long as the engine 10 is running.

When this routine starts, the electronic control unit 40 determines whether an F/C request flag is set in step S200. If an F/C request flag has not been set (S200: NO), the electronic control unit 40 ends the current cycle of the routine.

If an F/C request flag has been set (S200: YES), the electronic control unit 40 proceeds to step S210. In step S210, the electronic control unit 40 determines whether an F/C request flag was cleared when the routine was performed in the previous cycle. Specifically, the electronic control unit 40 determines whether the filter regeneration control routine switched from a state in which the F/C request flag is cleared to a state in which an F/C request flag is set during a period from the previous cycle of the routine to the current cycle of the routine. If a positive determination is given in step S210 (S210: YES), the electronic control unit 40 proceeds to step S250. If a negative determination is given (S210: NO), the electronic control unit 40 proceeds to step S220.

If the electronic control unit 40 proceeds to step S250, an interruption flag is cleared and a current engine coolant temperature TW is set as a starting coolant temperature TW1 in step S250. The interruption flag is set to indicate temporary interruption of fuel cut-off for filter regeneration. Then, in step S260, fuel cut-off for filter regeneration is permitted. Then, the electronic control unit 40 ends the current cycle of the routine.

If a negative determination is given in step S210 (S210: NO), the electronic control unit 40 proceeds to step S220. In step S220, the electronic control unit 40 determines whether there is a request to warm the passenger compartment. If warming has not been requested (S220: NO), the electronic control unit 40 proceeds to step S260 and permits fuel cut-off in step S260. Then, the electronic control unit 40 ends the current cycle of the routine. That is, when the F/C request flag is set, fuel cut-off is permitted as long as there is no warming request.

If there is a warming request (S220: YES), the electronic control unit 40 proceeds to step S230. In step S230, the electronic control unit 40 determines whether an interruption flag is set. If an interruption flag is set (S230: YES), the process proceeds to step S240. If an interruption flag is not set (S230: NO), the process proceeds to step S270.

If an interruption flag is not set (S230: NO), the process proceeds to step S270. In step S270, an interruption determination value T1 is set based on the current engine coolant temperature TW. The interruption determination value T1 is set using an operation map MAP1, which will be described later. The operation map MAP1 is stored in the memory 42 in advance. Then, in step S280, the electronic control unit 40 determines whether a difference obtained by subtracting the current engine coolant temperature TW from the starting coolant temperature TW1 (i.e., TW1-TW) is greater than or equal to the interruption determination value T1. In the description hereafter, the above difference will be referred to as the coolant temperature decrease amount subsequent to F/C initiation. If the coolant temperature decrease amount subsequent to F/C initiation is less than the interruption determination value T1 (S280: NO), the electronic control unit 40 proceeds to step S260 and permits fuel cut-off in step S260. Then, the electronic control unit 40 ends the current cycle of the routine. If the coolant temperature decrease amount subsequent to F/C initiation is greater than or equal to the interruption determination value T1 (S280: YES), the electronic control unit 40 proceeds to step S290. In step S290, the electronic control unit 40 sets the interruption flag. The electronic control unit 40 also sets the current engine coolant temperature TW as an interruption coolant temperature TW2. In step S290, a restart determination value T2 is set based on the current engine coolant temperature TW. The restart determination value T2 is set using an operation map MAP2, which will be described later. The operation map MAP2 is stored in the memory 42 in advance. Then, in step S300, fuel cut-off is prohibited. Then, the electronic control unit 40 ends the current cycle of the routine.

If the interruption flag is set (S230: YES), the electronic control unit 40 proceeds to step S240. In step S240, the electronic control unit 40 determines whether a difference obtained by subtracting the interruption coolant temperature TW2 from the current engine coolant temperature TW (i.e., TW-TW2) is higher than or equal to the restart determination value T2. The above difference will be referred to as the coolant temperature increase amount subsequent to F/C interruption. If the coolant temperature increase amount subsequent to F/C interruption is less than the restart determination value T2 (S240: NO), fuel cut-off is prohibited in step S300. Then, the electronic control unit 40 ends the current cycle of the routine. If the coolant temperature increase amount subsequent to F/C interruption is higher than or equal to the restart determination value T2 (S240: YES), the electronic control unit 40 proceeds to step S250. In this case, the electronic control unit 40 clears the interruption flag and sets the starting coolant temperature TW1 in step S250 and permits fuel cut-off in step S260, as described above. Then, the electronic control unit 40 ends the current cycle of the routine.

The operation and advantages of the present embodiment will now be described.

In the filter regeneration control, if the estimated PM deposition amount PS of the filter 28 is greater than or equal to the regeneration request determination value P1 (S100: YES), the temperature increasing process for raising the temperature of the filter 28 is started (S110). The temperature increasing process continues until the estimated filter temperature TF becomes higher than or equal to the PM combustion temperature (S120: YES). When the temperature increasing process ends, the electronic control unit 40 sets the F/C request flag (S140).

If the F/C determination routine is performed for the first time after the F/C request flag is cleared and set, the electronic control unit 40 proceeds to step S250. In step S250, the electronic control unit 40 clears the interruption flag and sets the current engine coolant temperature TW as the starting coolant temperature TW1. Then, the electronic control unit 40 permits fuel cut-off (S260) and starts performing fuel cut-off on the engine 10.

If there is no warming request during air conditioning control (S220: NO), fuel cut-off is permitted continuously until the F/C request flag is cleared. Thus, fuel cut-off continues until regeneration of the filter 28 is completed when the estimated PM deposition amount PS becomes less than or equal to the regeneration completion determination value P2.

During fuel cut-off, combustion is stopped in the engine 10. This decreases the engine coolant temperature TW over time. The heater core 38 performs heat exchange between the coolant and the air sent to the passenger compartment to warm the passenger compartment. Accordingly, if fuel cut-off for filter regeneration continues for a long time when the passenger compartment is being warmed, the engine coolant temperature TW will decrease. Thus, the passenger compartment may not be sufficiently warmed, and the vehicle occupants may feel uncomfortable.

In the present embodiment, if there is a warming request during air conditioning control (S220: YES) and the coolant temperature decrease amount subsequent to F/C initiation is greater than or equal to the interruption determination value T1 after fuel cut-off is started (S280: YES), the interruption flag is set (S290) and fuel cut-off is prohibited (S300). The coolant temperature decrease amount subsequent to F/C initiation is a difference obtained by subtracting the current engine coolant temperature TW from the starting coolant temperature TW1. The engine coolant temperature TW immediately after setting the F/C request flag is set as the starting coolant temperature TW1. In the present embodiment, fuel cut-off is temporarily interrupted when there is a warming request and the amount of decrease in engine coolant temperature TW from a start of a fuel cut is greater than or equal to the interruption determination value T1.

Such a controller for an engine in the present embodiment performs an interruption process that interrupts fuel cut-off if the following two conditions are satisfied during fuel cut-off for filter regeneration. Condition (A): warming of the passenger compartment is requested and condition (B): the engine coolant temperature TW becomes lower than or equal to a predetermined temperature after starting fuel cut-off, specifically, a value obtained by subtracting the interruption determination value T1 from the starting coolant temperature TW1.

Figure 4:
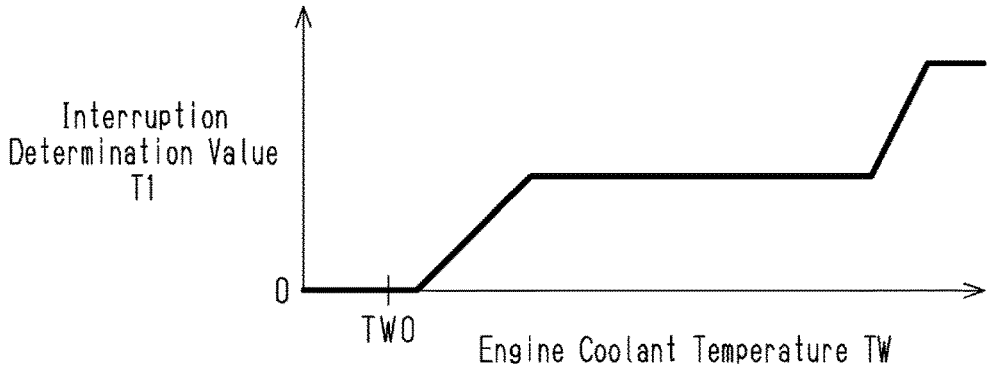
FIG. 4 is a graph showing the relationship between an interruption determination value and engine coolant temperatures used in the F/C determination routine shown in FIG. 3.

In the present embodiment, the operation MAP1 stored in advance in the memory 42 of the electronic control unit 40 is used to set the interruption determination value T1 based on the engine coolant temperature TW as described above. FIG. 4 shows the relationship between the engine coolant temperature TW and the interruption determination value T1 in the operation map MAP1. In a case in which the engine coolant temperature TW is higher than a certain level, even if the engine coolant temperature TW slightly decreases thereafter, the temperature of the air sent to the passenger compartment will not be significantly decreased to a level that will be noticed by the vehicle occupants. If the engine coolant temperature TW decreases to lower than or equal to the air delivery stopping temperature TW0, the flow of air sent to the passenger compartment will be stopped so that the vehicle occupants will not perceive the change. Accordingly, in the present embodiment, as shown in FIG. 4, the interruption determination value T1 is set to a larger value when the engine coolant temperature TW is high than when the engine coolant temperature TW is low. That is, the interruption determination value T1 is set to monotonically increase as the engine coolant temperature TW increases. In the present embodiment, in a low temperature range including the air delivery stopping temperature TW1, 0 is set as the interruption determination value T1 so that fuel cut-off is interrupted before the engine coolant temperature TW is lowered to the air delivery stopping temperature TW0.

If fuel cut-off is interrupted, combustion is restarted in the engine 10 to increase the engine coolant temperature TW. In the present embodiment, if the coolant temperature increase amount subsequent to interruption becomes higher than or equal to the restart determination value T2 after fuel cut-off is interrupted (S240: YES), the interruption flag is cleared (S250), and fuel cut-off is permitted again (S260). The coolant temperature increase amount subsequent to interruption is the difference obtained by subtracting the interruption coolant temperature TW2 from the current engine coolant temperature TW. The engine coolant temperature TW when fuel cut-off is interrupted is set as the interruption coolant temperature TW2. In the present embodiment, fuel cut-off is restarted if the amount of increase in the engine coolant temperature TW after fuel cut-off is interrupted becomes greater than or equal to the restart determination value T2.

Such a controller for an engine in the present embodiment performs a restart process that restarts fuel cut-off after interrupting fuel cut-off in the interruption process if the following condition is satisfied. Condition (C): the engine coolant temperature TW becomes higher than or equal to a predetermined temperature after a fuel cut is interrupted, specifically, a value obtained by adding the restart determination value T2 to the interruption coolant temperature TW2.

Figure 5:
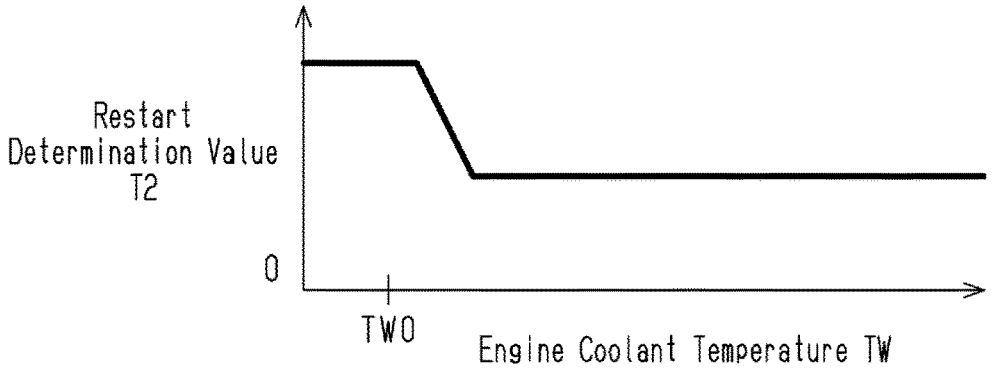
FIG. 5 is a graph showing the relationship between a restart determination value and engine coolant temperatures used in the F/C determination routine shown in FIG. 3.

In the present embodiment, the operation MAP2 stored in advance in the memory 42 of the electronic control unit 40 is used to set the restart determination value T2 based on the engine coolant temperature TW when fuel cut-off is interrupted as described above. FIG. 5 shows the relationship between the engine coolant temperature TW and the restart determination value T2 in the operation map MAP2. As described above, when warming the passenger compartment, fuel cut-off may be interrupted before stopping the flow of air to the passenger compartment if the engine coolant temperature TW becomes lower than or equal to the air delivery stopping temperature TW0. Thus, in the present embodiment, the restart determination value T2 is set to a larger value when the engine coolant temperature TW is low than when the engine coolant temperature TW is high in order to restart fuel cut-off when the engine coolant temperature TW is slightly higher than the air delivery stopping temperature TW0. That is, the restart determination value T2 is set to monotonically decrease as the engine coolant temperature TW increases.

When fuel cut-off is restarted, the current engine coolant temperature TW is set again as the starting coolant temperature TW1. Thus, after restarting fuel cut-off, if the amount of decrease in engine coolant temperature TW after restart becomes greater than or equal to the interruption determination value T1 before filter regeneration is completed, fuel cut-off is interrupted again.

Figure 6:
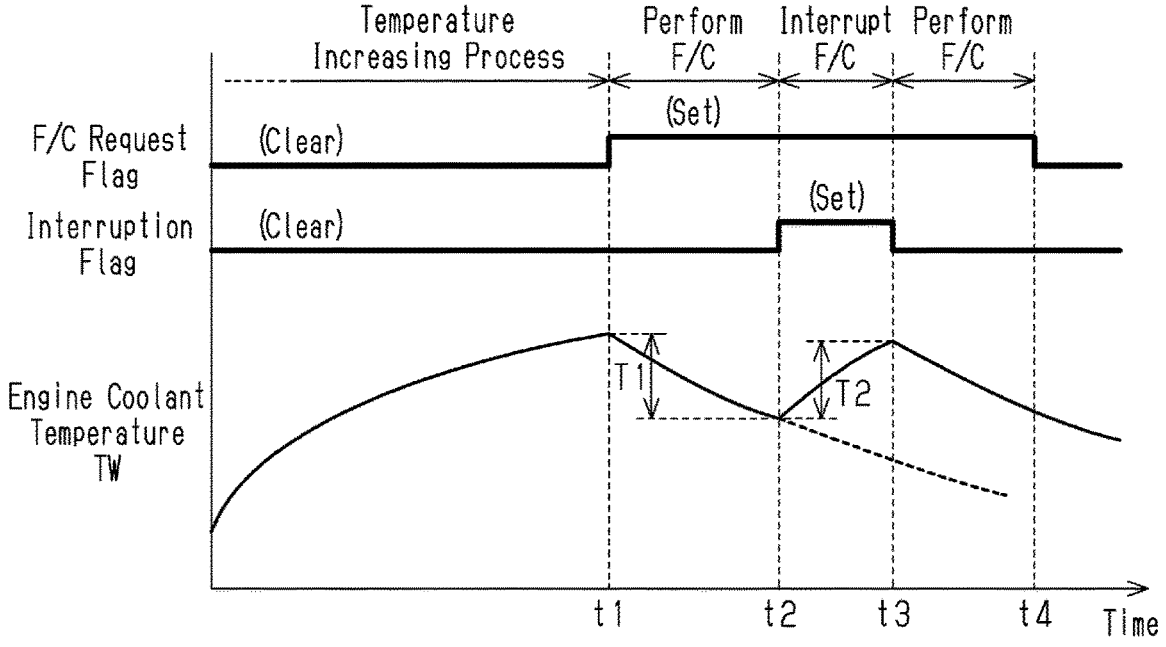
FIG. 6 is a time chart showing one example of a fuel cut-off performed during the filter regeneration control executed by the controller of FIG. 1.

FIG. 6 shows an example of filter regeneration control when a warming request is issued during air conditioning control in the present embodiment. In FIG. 6, dotted lines show a change in the engine coolant temperature TW when fuel cut-off for filter regeneration is continued until regeneration of the filter 28 is completed even if the engine coolant temperature TW is decreased while warming is being requested.

At time t1 in FIG. 6, a temperature increasing process increases the estimated filter temperature TF to higher than or equal to the PM combustion temperature and sets the F/C request flag. Fuel cut-off is started at time t1. During the fuel cut-off, combustion is not performed in the engine 10, and the engine coolant temperature TW decreases. Accordingly, if the fuel cut-off continues until regeneration of the filter 28 is completed, the engine coolant temperature TW will become excessively low, and the passenger compartment may not be sufficiently warmed.

In this respect, in the present embodiment, when the amount of decrease in the engine coolant temperature TW after fuel cut-off reaches the interruption determination value T1 at time t2, the interruption flag is set to interrupt the fuel cut-off d. As a result, combustion is restarted in the engine 10 to increase the engine coolant temperature TW from time t2.

Then, when the amount of increase in the engine coolant temperature TW after the interruption of the fuel cut-off reaches the restart determination value T2 at time t3, the interruption flag is cleared and fuel cut-off is restarted. Then, regeneration of the filter is completed and the F/C request flag is cleared at time t4 and fuel cut-off ends at time t4.

The controller for an engine of the present embodiment maintains the heating performance even if filter regeneration is performed when the passenger compartment is being warmed. That is, the controller for an engine performs fuel cut-off for filter regeneration without adversely affecting the drivability, which may result from lowered heating performance, when the passenger compartment is being warmed. As a result, there is no need to prohibit fuel cut-off to maintain heating performance. This increases opportunities to perform filter regeneration through fuel cut-off.

The present embodiment may be modified as described below. The present embodiment and the following modifications can be combined as long as the combined modifications are not in contradiction.

In the embodiment, the interruption determination value T1 and the restart determination value T2 are variably set based on the engine coolant temperature TW. Instead, these values may be fixed.

In the embodiment, restart of a fuel cut-off after interruption is determined based on the amount of increase in the engine coolant temperature TW after interruption. This determination may be made based on the value of the engine coolant temperature TW. That is, a fuel cut-off may be restarted when the engine coolant temperature TW becomes higher than or equal to a fixed value after interrupting the fuel cut-off Further, the time for restarting a fuel cut-off may be determined based on a parameter other than the engine coolant temperature TW. For example, fuel cut-off may be restarted when a fixed period of time has elapsed from when the fuel cut-off was interrupted.

In the embodiment, restart of a fuel cut-off when heating is requested is determined based on the amount of decrease in the engine coolant temperature TW after the fuel cut-off is started. This determination may be made based on the value of the engine coolant temperature TW. That is, a fuel cut-off may be interrupted when the engine coolant temperature TW becomes lower than or equal to a fixed value after the fuel cut-off is started.

The controller for an engine in the embodiment performs fuel cut-off or filter regeneration while maintaining rotation of the engine 10 with force generated by the first motor generator 11. Instead, such a fuel cut-off may be performed while rotation of the engine 10 is maintained with force transmitted by a wheel during coasting of a vehicle.

Filter regeneration control by the controller for an engine in the embodiment may be applied to vehicles other than hybrid vehicles in the same or similar manner.

The electronic control unit 40, which corresponds to the controller for an engine, includes an arithmetic processing circuit 41 and a memory 42 and executes software processing. However, this is only an example. For example, the electronic control unit 40 may include a dedicated hardware circuit (such as ASIC) that executes at least part of the software processing executed in the above embodiment. That is, the electronic control unit 40 may be modified to have any one of the following configurations (a) to (c). (a) A configuration including a processor that executes all of the above-described processes according to programs and a program storage device such as a memory that stores the programs. (b) A configuration including a processor that execute part of the above-described processes according to the programs and a program storage device and a dedicated hardware circuit that executes the remaining processes. (c) A configuration including a dedicated hardware circuit that executes all of the above-described processes. A plurality of software circuits each including a processor and a program storage device and a plurality of dedicated hardware circuits may be provided. That is, the above processes may be executed by processing circuitry that includes at least one of a set of one or more software circuits or a set of one or more dedicated hardware circuits. The program storage device, or computer readable media, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an engine, wherein the engine is installed in a vehicle configured to use heat of an engine coolant to warm a passenger compartment, and the engine includes an exhaust passage including a filter configured to collect fine particulate matter from exhaust gas, the controller comprising:

processing circuitry configured to perform fuel cut-off for regenerating the filter by burning fine particulate matter collected in the filter, and the processing circuitry is configured to perform an interruption process for interrupting the fuel cut-off in a case in which warming of the passenger compartment is requested when the fuel cut-off is being performed and an engine coolant temperature, which is a temperature of the engine coolant, becomes lower than or equal to a predetermined temperature after the fuel cut-off is started.

2. The controller for an engine according to claim 1, wherein the processing circuitry is configured to interrupt the fuel cut-off in the interruption process in a case in which an amount of decrease in the engine coolant temperature from when the fuel cut-off is started becomes greater than or equal to an interruption determination value.

3. The controller for an engine according to claim 2, wherein the interruption determination value is set to a larger value when the engine coolant temperature is high than when the engine coolant temperature is low.

4. The controller for an engine according to claim 1, wherein the processing circuitry is configured to perform a restart process that restarts the fuel cut-off when the engine coolant temperature becomes higher than or equal to a predetermined temperature after the fuel cut-off is interrupted by the interruption process.

5. The controller for an engine according to claim 4, wherein the processing circuitry is configured to restart the fuel cut-off in the restart process when an amount of increase in the engine coolant temperature after the fuel cut-off is interrupted by the interruption process becomes greater than or equal to a restart determination value.

6. The controller for an engine according to claim 5, wherein the restart determination value is set to a larger value when the engine coolant temperature is low than when the engine coolant temperature is high.

7. A method for controlling an engine, wherein the engine is installed in a vehicle configured to use heat of an engine coolant to warm a passenger compartment, and the engine includes an exhaust passage that includes a filter configured to collect fine particulate matter from exhaust gas, the method comprising:

performing a fuel cut-off for regenerating the filter by burning fine particulate matter collected in the filter; and performing an interruption process that interrupts the fuel cut-off in a case in which warming of the passenger compartment is requested when the fuel cut-off is being performed and an engine coolant temperature, which is a temperature of the engine coolant, becomes lower than or equal to a predetermined temperature after the fuel cut-off is started.

*8. The controller for an engine according to claim 2, wherein the processing circuitry is configured to perform a restart process that restarts the fuel cut-off when the engine coolant temperature becomes higher than or equal to a*

*predetermined temperature after the fuel cut-off is interrupted by the interruption process.*

*9. The controller for an engine according to claim 3, wherein the processing circuitry is configured to perform a restart process that restarts the fuel cut-off when the engine coolant temperature becomes higher than or equal to a predetermined temperature after the fuel cut-off is interrupted by the interruption process.*

* * * * *